United States Patent
Shannon

(10) Patent No.: US 11,685,557 B1
(45) Date of Patent: *Jun. 27, 2023

(54) INFLATABLE BLADDER FAIRING RECOVERY SYSTEM WITH REPOSITIONING MECHANISMS AND METHOD

(71) Applicant: United Launch Alliance, L.L.C., Centennial, CO (US)

(72) Inventor: Ryan Shannon, Castle Rock, CO (US)

(73) Assignee: United Launch Alliance, L.L.C., Centennial, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/379,766

(22) Filed: Jul. 19, 2021

Related U.S. Application Data

(63) Continuation of application No. 16/385,912, filed on Apr. 16, 2019, now Pat. No. 11,066,193.

(60) Provisional application No. 62/700,755, filed on Jul. 19, 2018, provisional application No. 62/658,043, filed on Apr. 16, 2018.

(51) Int. Cl.
  *B64G 1/62* (2006.01)
  *F42B 10/50* (2006.01)

(52) U.S. Cl.
  CPC ............... *B64G 1/62* (2013.01); *F42B 10/50* (2013.01)

(58) Field of Classification Search
  CPC ............ B64G 1/62; F42B 10/50; F42B 10/48
  See application file for complete search history.

(56) References Cited

U.S. PATENT DOCUMENTS

| | | |
|---|---|---|
| 3,286,951 A | 11/1966 | Kendall |
| 4,832,288 A | 5/1989 | Kendall et al. |
| 5,927,653 A | 7/1999 | Mueller et al. |
| 6,158,693 A | 12/2000 | Mueller et al. |
| 6,237,875 B1 | 5/2001 | Menne et al. |
| 6,682,017 B1 | 1/2004 | Giannakopoulos |
| 7,219,859 B2 | 5/2007 | Johnson et al. |
| 9,187,191 B1 | 11/2015 | Jensen et al. |
| 9,452,843 B1 | 9/2016 | Lu et al. |
| 9,852,330 B1 | 12/2017 | Shannon |

(Continued)

FOREIGN PATENT DOCUMENTS

| | | |
|---|---|---|
| CN | 106564627 | 4/2017 |
| DE | 4422617 | 6/1995 |

OTHER PUBLICATIONS

U.S. Appl. No. 16/113,064, filed Aug. 27, 2018, Shannon.

(Continued)

*Primary Examiner* — Rodney A Bonnette
(74) *Attorney, Agent, or Firm* — Sheridan Ross P.C.

(57) ABSTRACT

Embodiments of the present invention relate to a launch vehicle fairing recovery system and method using inflatable bags and fairing repositioning mechanisms. Embodiments of the present invention also relate to providing a system or mechanism to flip the fairing into the proper floating position. In some embodiments, the fairing has an inner surface and an outer surface, where the outer surface is exposed to the atmosphere when the fairing is interconnected to a spacecraft, and one or more inflatable bags interconnected to the outer surface of the fairing, where when the fairing is interconnected to the spacecraft the one or more inflatable bags is empty, and after the fairing separates from the spacecraft the one or more airbags are filled with pressurized gas and/or hydraulic liquids.

19 Claims, 10 Drawing Sheets

(56) References Cited

U.S. PATENT DOCUMENTS

| | | |
|---|---|---|
| 10,712,231 B1 | 7/2020 | Shannon |
| 11,066,193 B1 | 7/2021 | Shannon |
| 2003/0042367 A1 | 5/2003 | Carpenter et al. |
| 2011/0233341 A1 | 9/2011 | Monteforte |
| 2016/0167793 A1 | 6/2016 | Geneste |
| 2016/0280399 A1 | 9/2016 | Tkach et al. |
| 2016/0280400 A1 | 9/2016 | Albright et al. |

OTHER PUBLICATIONS

Ragab et al., "Launch Vehicle Recovery and Reuse," American Institute of Aeronautics and Astronautics, Apr. 23, 2015, retrieved from https://www.ulalaunch.com/docs/default-source/supporting-technologies/launch-vehicle-recovery-and-reuse-(aiaa-space-2015).pdf, 10 pages.

Official Action for U.S. Appl. No. 16/385,912, dated Nov. 27, 2020, 13 pages.

Notice of Allowance for U.S. Appl. No. 16/385,912, dated Mar. 17, 2021, 9 pages.

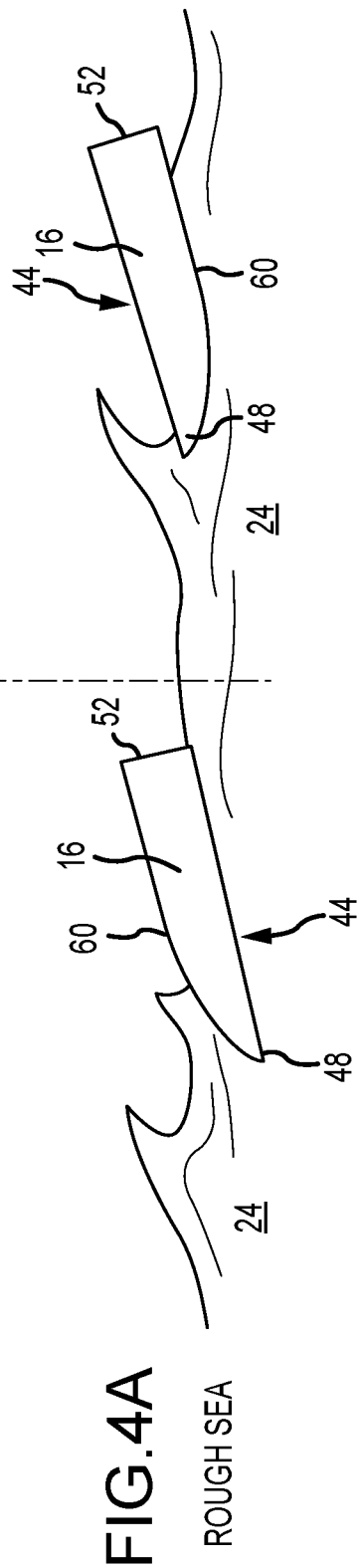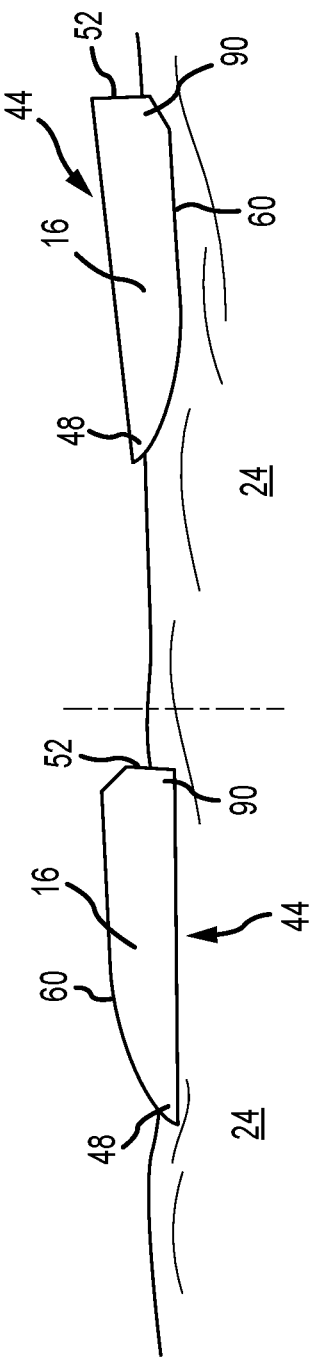
FIG.4A ROUGH SEA
FIG.4B CALM SEA

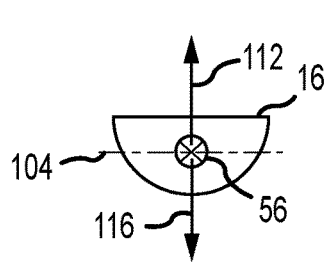
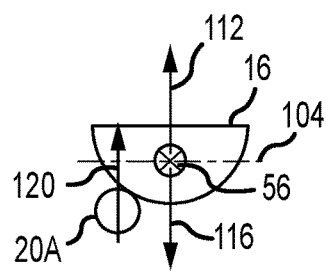
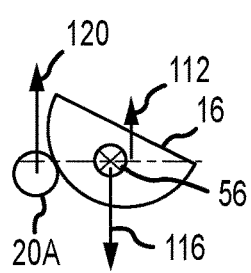
FIG.6  FIG.7  FIG.8
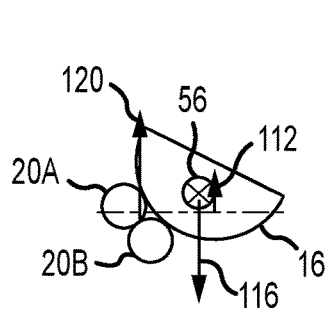
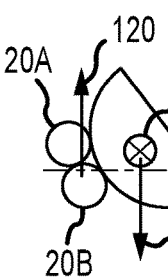
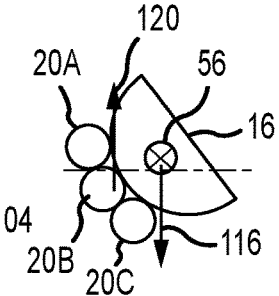
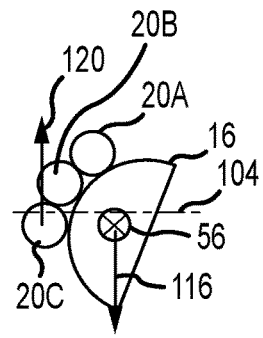
FIG.9  FIG.10  FIG.11  FIG.12
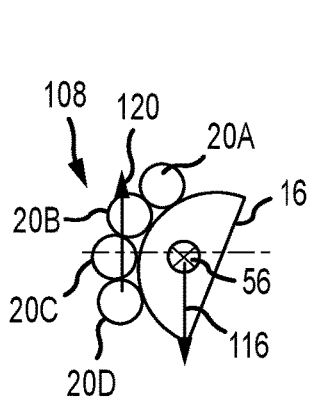
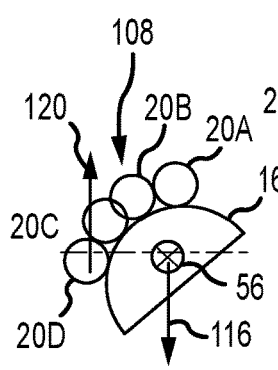
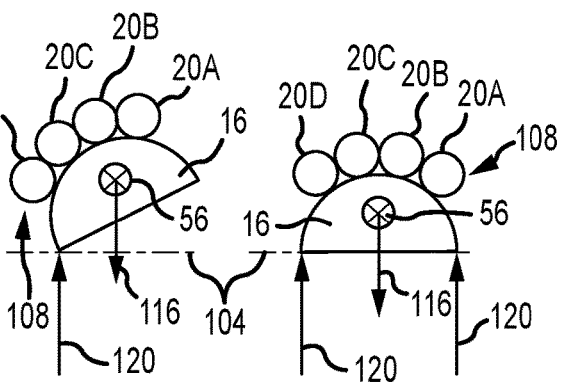
FIG.13  FIG.14  FIG.15  FIG.16

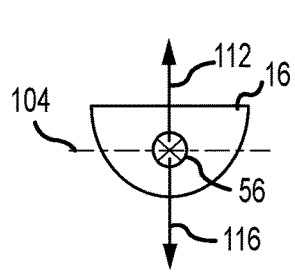
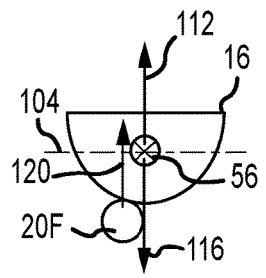
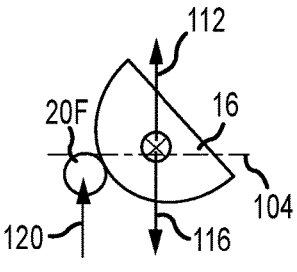
FIG.17　　FIG.18　　FIG.19
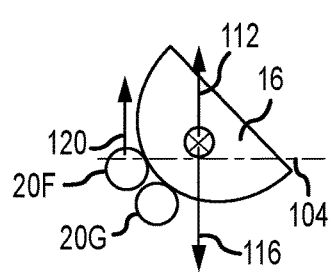
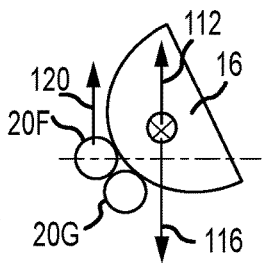
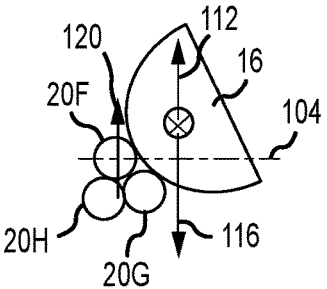
FIG.20　　FIG.21　　FIG.22
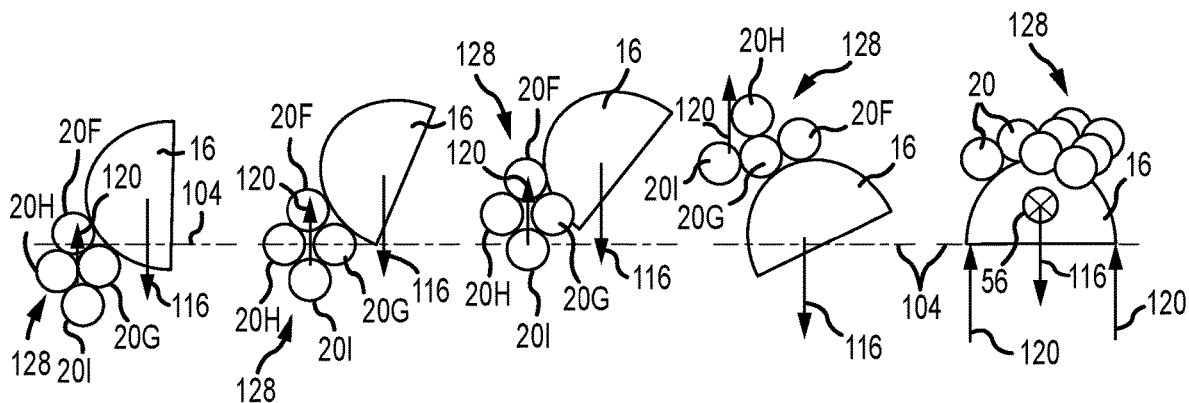
FIG.23　FIG.24　FIG.25　FIG.26　FIG.27

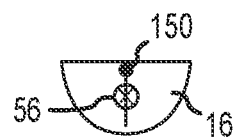
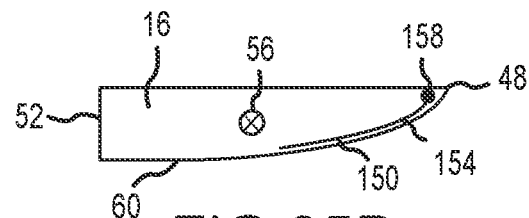
FIG.35A  FIG.35B
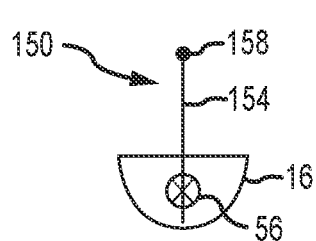
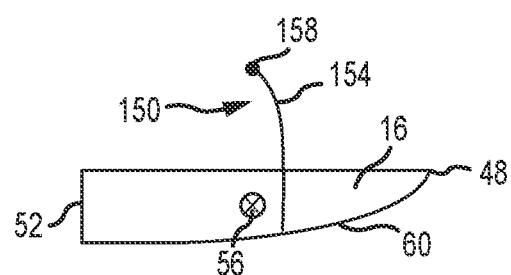
FIG.36A  FIG.36B
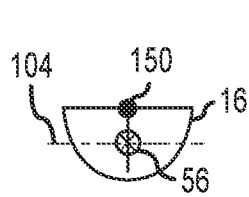 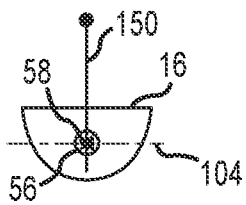 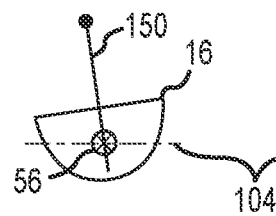 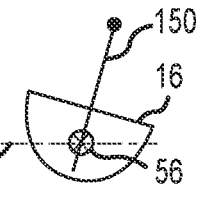
FIG.37  FIG.38  FIG.39  FIG.40
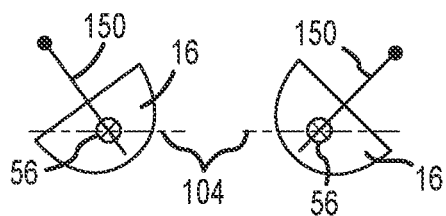 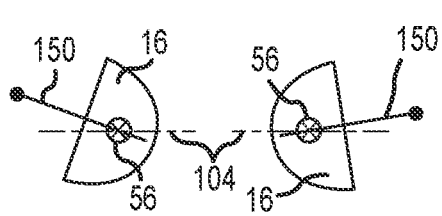 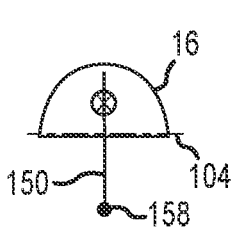
FIG.41  FIG.42  FIG.43  FIG.44  FIG.45

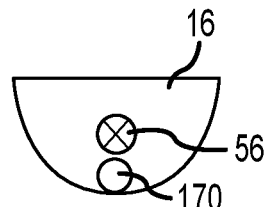
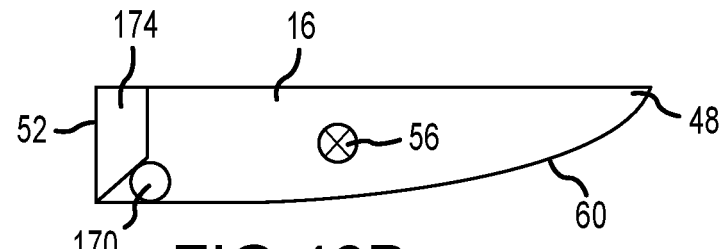
FIG.46A  FIG.46B
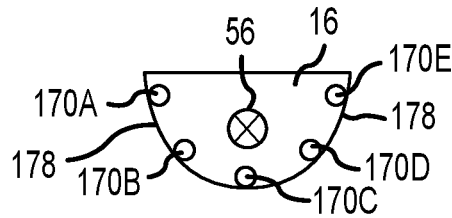
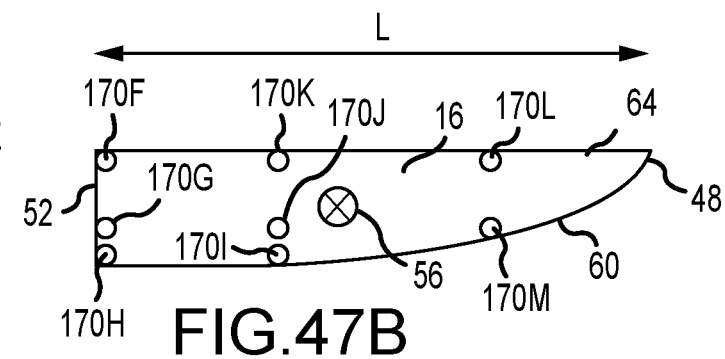
FIG.47A  FIG.47B
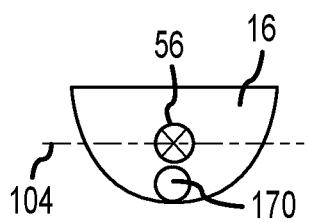 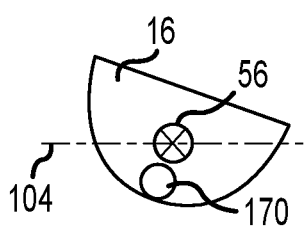 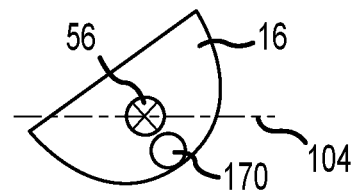
FIG.48  FIG.49  FIG.50
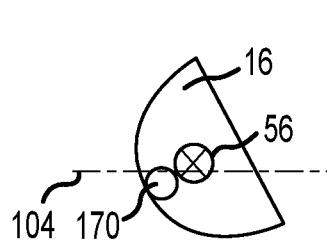 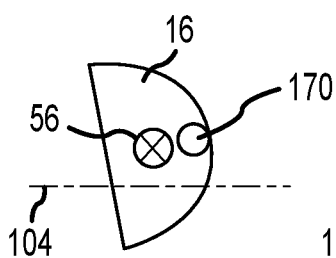 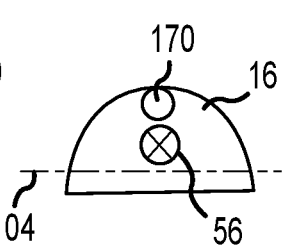
FIG.51  FIG.52  FIG.53

INFLATABLE BLADDER FAIRING RECOVERY SYSTEM WITH REPOSITIONING MECHANISMS AND METHOD

CROSS REFERENCE TO RELATED APPLICATIONS

This application is a continuation of U.S. patent application Ser. No. 16/385,912, filed Apr. 16, 2019, which claims the benefit of priority from U.S. Provisional Patent Application Ser. No. 62/700,755, filed Jul. 19, 2018, entitled "INFLATED BAG FAIRING RECOVERY SYSTEM AND METHOD"; and claims priority from U.S. Provisional Patent Application Ser. No. 62/658,043, filed Apr. 16, 2018, entitled "INFLATED BAG FAIRING RECOVERY SYSTEM AND METHOD"; the entire disclosures of which are hereby expressly incorporated by reference in their entireties.

FIELD OF THE INVENTION

Embodiments of the present invention generally relate to a fairing recovery system and method, and more specifically to a launch vehicle fairing recovery system and method using inflatable bladders or bags and repositioning mechanisms. Embodiments of the present invention also relate to providing a system or mechanism to reorient or flip the fairing into a proper floating position.

BACKGROUND OF THE INVENTION

Launch vehicle fairings are necessary to protect the spacecraft and payload(s) during ascent. The fairings separate from the launch vehicle at a predetermined altitude and fall back to Earth. Because fairings account for a portion of the launch cost, perhaps as much as five percent, fairing reuse would reduce the overall launch cost.

Previous attempts have been made to recover and reuse fairings following separation from the launch vehicle. Some prior art fairing recovery techniques include fairings that deploy parafoils and are then retrieved mid-air by an aircraft (e.g., a helicopter) or are caught by a marine vessel, such as a barge. These solutions have disadvantages, including requiring instantaneous re-entry alignment by the barge and/or aircraft to catch the fairings. Additionally, the parafoils or parachutes may tangle and not function properly.

SUMMARY OF THE INVENTION

These and other needs are addressed by the various embodiments and configurations of the present invention. This disclosure relates to a novel fairing, launch vehicle component, and spacecraft component recovery system, device, and methods.

It is one aspect of various embodiments of the present invention to provide a fairing recovery system that does not require or need instantaneous re-entry alignment. Additionally, embodiments of the present invention are less expensive and less complex than prior art systems. Moreover, embodiments of the present invention do not require mid-air catching of the fairing while in descent with a marine vessel or aircraft, which gives the launch operator greater schedule and location flexibility.

In one embodiment, the fairing recovery system includes one or more inflatable bladders or bags for each fairing. After the fairing separates from the launch vehicle, the one or more bladders are deployed. To deploy the bladders, the bladders may be inflated with air, a gas, a liquid, a solid (such as foam), or a combination of two or more of these. Preferably, the bladder is filled with pressurized nitrogen and/or hydraulic liquids. The bladders or bags themselves may be made from a robust material capable of withstanding ascent, inflation, descent, and splash down or impact. One exemplary material is Vectran, a fiber spun from liquid-crystal polymer, made by Celanese Corporation or Kuraray. The inflated bladders may function as protection or a heat shield during re-entry and/or an air-break during descent, slowing the fairing's impact with the water. Upon splash down, the inflated bladders can absorb some of the forces when the fairing impacts the water to reduce or eliminate damage to the fairing when it lands in water, preferably an ocean.

It is one aspect of embodiments of the present invention to provide an array of inflatable bladders with the fairing, where different airbags in the array perform different functions and have different properties. For example, in one embodiment, the array comprises a plurality of "deflating" bladders and a plurality of "floating" bladders. The deflating bladders are designed to burst upon impact to absorb some impact forces. The deflating bladders may be a lighter or less robust material than the other inflatable bladders in the array. The floating bladders are designed to float the fairing on the water. The deflating and floating bladders may be on all sides of the fairing such that it does not matter what portion or side of the fairing impacts the water. The deflating and floating bladders may deploy at different times. For example, the deflating bladders may deploy shortly after the fairing separates from the upper stage and may deflate as the fairing impacts the water. Then the floating bladders may be deployed shortly before, simultaneous with or after the fairing impacts the water. The deployment of the floating bladders can also be used to reorient or reposition the fairing into a desired floating position.

Further, the bladders may be arranged in a way or have properties that reorient or flip the fairing into a preferred or proper floating position if the fairing impacts the water in a position other than the desired floating position. For example, inflatable bladders or bags may be located on one side of the fairing such that should the fairing come to rest with the wrong side facing the water, bladders will deploy that reorient the fairing onto the opposite, desired side. The bladders are configured to flip the fairing over such that the floating bladders are now in contact with the water. In some embodiments, the floating bladders are only on one side of the fairing because the fairing has a preferred floating position. In other embodiments, the bladders may be on both sides of the fairing.

In various embodiments, it is desirable for the fairing to float in a concave position because the concave position may trap air under the fairing and prevent the fairing from sinking. However, in some embodiments, the fairing has insulation on the inside surface. Thus, in the concave position, the insulation may absorb the salt water, which could prevent reuse of the fairing, could require extensive cleaning, or even require new insulation be installed on the fairing which could undermine the potential savings of reusing the fairing. In contrast, if the fairing is in the convex position, then the fairing could take on water in rough seas and sink. To address this problem, in various embodiments, the fairing may have a boattail. The boattail can block sea water from filling the fairing when oriented in a convex position. The boattail can also block the air trapped under the fairing from escaping when the fairing is in the concave position.

Corrosive effects from salt water occur when the fairing is exposed to air (oxygen) following exposure to salt water. Therefore, in some embodiments, the fairing may be permitted to remain in a concave position to limit the exposure to oxygen. Corrosion can be reduced if exposure to air is reduced. In an alternative embodiment, inflatable bladders could be deployed upon splash down to completely lift the fairing out of the water to avoid prolonged contact with salt water.

It is another aspect of embodiments of the present invention to provide a system or mechanism to reorient or flip the fairing into the proper floating position. Similar systems or mechanisms could be used on small watercraft (e.g., boats, ships, rafts, dinghies, other water vehicles, etc.) to prevent the watercraft from capsizing. The proper floating position may be concave or convex depending on the situation and the fairing configuration. Inflatable bladders or bags and/or torsional resonance may be used to reorient the fairing.

In some embodiments, inflatable bladders or bags are used to flip the fairing into the desired floating position. In one embodiment, inflatable bladders are positioned and deployed in a sequence to act as a rotation ladder to flip the fairing. Here, one bladder is deployed at a time, sequentially—one after another. However, two or more bladders could be deployed at the same time. As each bladder is deployed, a force is imparted on the fairing to tilt the fairing more and more in the desired direction, until finally the fairing flips entirely over into the desired final floating position. In another embodiment, the inflatable bladders or bags are positioned and deployed in a sequence to act as a rotation cluster to reorient the fairing. As each inflatable bladder is deployed, a force is imparted on the fairing to tilt or shift the fairing more and more in the desired direction, until finally the fairing flips over into the desired final floating position. In yet another embodiment, inflatable bladders or bags are positioned and deployed to act as an "L" lever to reorient or flip the fairing over and into the desired final floating position. In this embodiment, a group of inflatable bladders is deployed, forming one leg of the "L." Subsequently, another group of inflatable bladders is deployed, forming the other leg of the "L." Each leg of the "L" reorients or flips the fairing an amount in the desired direction. In one embodiment, each leg of the "L" flips the fairing at least 90 degrees.

In other embodiments, torsional resonance is used to reorient or flip the fairing into the desired floating position. In one embodiment, a pendulum is used to reorient or flip the fairing. The pendulum is stored during flight and reentry. The pendulum is deployed once the fairing lands in the water in the undesired position. The pendulum has a motor that drives the pendulum at the fairing's natural or resonant rocking frequency of the fairing's roll oscillation. The fairing will rock more and more as the pendulum swings from side to side, until the fairing flips over. At this point, the motor would shut down. In another embodiment, a reaction wheel is used to reorient or flip the fairing into the desired floating position. The reaction wheel is weighted and rocks the fairing as the wheel rotates. The reaction wheel is driven by a motor at the natural frequency of the fairing's roll oscillation. The fairing will rock more and more as the reaction wheel rotates, until the fairing flips over. In one embodiment, only one reaction wheel is used and is located at the base of the payload adapter fitting proximate the base of the fairing (opposite the nose). In other embodiments, multiple reaction wheels are used and are positioned in various locations on the inside surface of the fairing.

It is another aspect of embodiments of the present invention to provide a method for monitoring the health of the fairings, detecting pad drift, and tanking stress. For example, checkers or dots (e.g., 5 dots per pixel) can be applied on the exterior or interior of the fairing. After the fairing is retrieved, testing can be performed using digital imaging correlation to assess the damage, if any, to the fairing during flight, re-entry, and/or splash down. This will assist the launch company in repairing the fairing as may be needed before it is reused on a subsequent launch. The applied pattern or markings may be conventional paint or ink used on the interior or exterior of the fairings. Alternatively, the markings may only be visible under ultraviolet or infrared light. Examples of markings, digital image correlation, and other methods and systems for assessing damage are disclosed and described in the following patent applications, all of which are incorporated by reference herein in their entireties: U.S. Provisional Patent Application No. 62/732, 372 entitled "Virtual digital Image correlation Apparatus and Method of Using the Same"; U.S. Pat. No. 9,852,330 entitled "System and Method to Enable the Application of Optical Tracking Techniques for Generating Dynamic Quantities of Interest with Alias Protection"; U.S. patent application Ser. No. 16/106,820 entitled "Applied High Speed Digital Image Correlation"; and U.S. patent application Ser. No. 16/113,064 entitled "System and Method for Rocket Engine Health Monitoring Using Digital Image Correlation."

Further, in some instances it will be desired to tow the fairing after capturing it. A fairing may be more stable to tow in the concave, nose forward position. Concave means the spine of the fairing is pointed upward and the inside surface of the fairing is facing downward in the water. When towed in the convex position (i.e., fairing spine down in the water and the inside fairing surface facing upward toward the air), the fairing may "breathe" or flex while being towed due to the forces imparted on the fairing from the waves. Breathing occurs when the fairing flexes inward and outward in a radial direction. Repeated flexing could weaken the structural integrity of the fairing and reduce its reuse value. Therefore, it may be preferred to put the recovered fairing on a barge or other boat to return it to the owner. The fairing may be recovered from the water by a barge or other means by lifting it out of the water.

In one embodiment, a fairing recovery system is provided comprising: a fairing with an inner surface and an outer surface, wherein when the fairing is interconnected to a launch vehicle, the inner surface faces toward the launch vehicle and the outer surface faces away from the launch vehicle; a plurality of inflatable bladders interconnected to the outer surface of the fairing, wherein when the fairing is interconnected to the launch vehicle the plurality of inflatable bladders are not inflated, and wherein after the fairing separates from the spacecraft one or more inflatable bladders in the plurality of inflatable bladders are at least partially inflated with pressurized nitrogen gas and/or hydraulic liquids.

In some embodiments, the plurality of inflatable bladders comprises: one or more deflating bladders that are inflated after the fairing separates from the launch vehicle and that deflate upon impact with a water surface; and one or more floating bladders that are inflated after the fairing impacts the water surface and remain inflated for a period of time following a time when the fairing impacts the water surface. In one embodiment, the fairing recovery system further comprises a torsional resonance element having an active state and an inactive state, wherein when in the active state the torsional resonance element imparts a motion to the fairing. In some embodiments, the torsional resonance element is selected from the group comprising: a pendulum with a motor and one or more reaction wheels with motors. In various embodiments, one or more of the plurality of inflatable bladders are deployed at different times after the fairing impacts a water surface, and wherein the plurality of inflatable bladders reorient the position of the fairing relative to the water. In some embodiments, the floating bladders are comprised of a different material than the deflating bladders.

In one embodiment, a fairing recovery system is provided comprising: a fairing; one or more inflatable bags interconnected to the fairing, wherein when the fairing is interconnected to a launch vehicle the one or more inflatable bags is not inflated, wherein after the fairing separates from the launch vehicle the one or more inflatable bags are inflated with pressurized fluid, and wherein the one or more inflatable bags cause the fairing to float in water after impact.

In various embodiments, the pressurized fluid can be a gas, liquid, or combination of gas and liquid. Additionally, the pressurized fluid is pressurized nitrogen gas and/or hydraulic liquids. In some embodiments, the fairing recovery system further comprises one or more deflating bags that are inflated after the fairing separates from the launch vehicle and that deflate upon impact with a water surface. Some embodiments also include a torsional resonance element having an active state and an inactive state, wherein when in the active state the torsional resonance element imparts a motion to the fairing.

In one embodiment, a method of recovering a fairing is provided comprising: providing a fairing with an inner surface and an outer surface, wherein when the fairing is interconnected to a spacecraft, the inner surface faces toward the spacecraft and the outer surface faces away from the spacecraft; providing a plurality of inflatable bladders interconnected to at least one of the outer surface and the inner surface of the fairing, wherein when the fairing is interconnected to the spacecraft the plurality of inflatable bladders is not inflated; at least partially filling one or more inflatable bladders in the plurality of inflatable bladders with pressurized fluid after the fairing separates from the spacecraft, wherein the one or more inflatable bladders cover at least a portion of the fairing during re-entry; and at least partially inflating a second inflatable bladder in the plurality of inflatable bladders with pressurized fluid after the fairing impacts a water surface such that the second inflatable bladder assists the fairing in floating on the water surface.

In some embodiments, the pressurized fluid can be a gas, liquid, or combination of gas and liquid. In various embodiments, the method of recovering a fairing further comprises at least partially filling a third inflatable bladder in the plurality of inflatable bladders with pressurized fluid after the fairing separates from the spacecraft, wherein the third inflatable bladder absorbs some of the impact forces when the fairing impacts the water surface. Additionally, the method of recovering a fairing can further comprise: providing a second plurality of inflatable bladders interconnected to at least one of the outer surface and the inner surface of the fairing; deploying inflatable bladders in the second plurality of inflatable bladders in succession after the fairing impacts the water surface; and reorienting a position of the fairing relative to the water surface. The method can also include rotating the fairing from a convex floating position to a concave floating position and/or rotating the fairing from a concave floating position to a convex floating position. In some embodiments, the method of recovering a fairing further comprises: providing a torsional resonance element interconnected to the fairing; and reorienting a position of the fairing relative to the water surface after the fairing lands on the water surface using the torsional resonance element. The torsional resonance element has an active state and an inactive state, and wherein when in the active state the torsional resonance element imparts a motion to the fairing.

As used herein, the terms "bladder," "bag," "inflated bladder," "inflated bag," "inflatable bladder," and "inflatable bag" can be used interchangeably.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

BRIEF DESCRIPTION OF THE DRAWINGS

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein.

The accompanying drawings, which are incorporated in and constitute a part of the specification, illustrate embodiments of the invention and together with the general description of the invention given above and the detailed description of the drawings given below, serve to explain the principles of the invention.

FIG. 4A shows a fairing floating in rough seas in the concave position and convex position;

FIG. 4B shows a fairing floating in calm seas in the concave position and convex position;

FIGS. 6-16 show a fairing with inflatable bladders forming a rotation ladder to flip the fairing over and show the sequence of the inflatable bladders being deployed and the fairing flipping over;

FIGS. 17-27 show a fairing with inflatable bladders forming a rotation cluster to flip the fairing over and show the sequence of the inflatable bladders being deployed and the fairing flipping over;

FIGS. 35A-B show a fairing with a pendulum in the stored position;

FIGS. 36A-B show the fairing with the pendulum deployed;

FIGS. 37-45 show a fairing with a pendulum to flip the fairing over and show the sequence of the pendulum rocking the fairing until the fairing flips over;

FIGS. 46A-B show a fairing with one reaction wheel;

FIGS. 47A-B show a fairing with multiple reaction wheels; and

FIGS. 48-53 show a fairing with a reaction wheel to flip the fairing over and show the sequence of the reaction wheel rocking the fairing until the fairing flips over.

Figure 1:
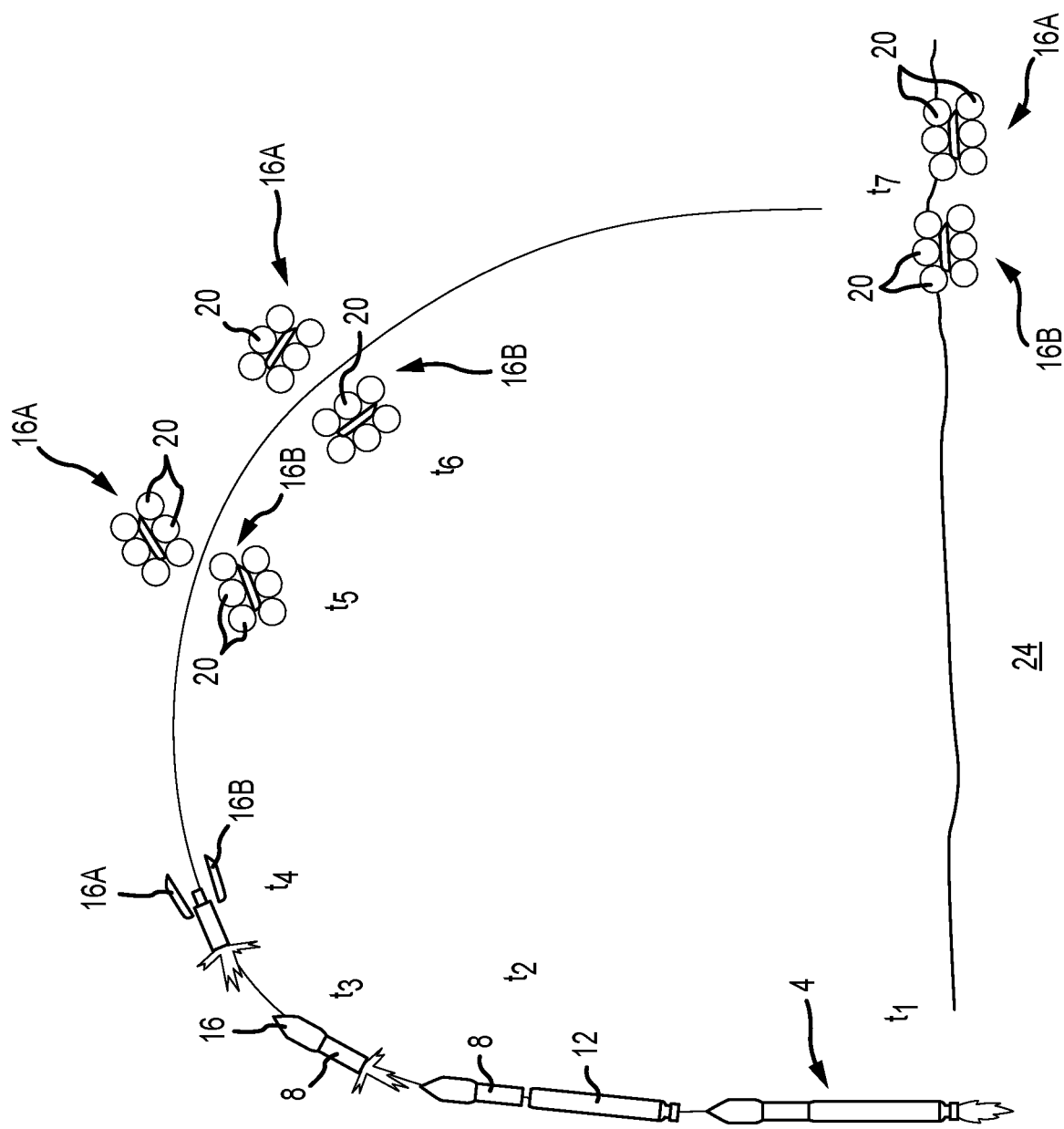
FIG. 1 shows the launch, separation, and recovery process of the launch vehicle, upper stage, rocket, and fairings over time.

It should be understood that the drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

The inflated bladders are not necessarily drawn to scale and may be different shapes in various embodiments, i.e., the bladders, when inflated, may be a shape other than spherical, including but not limited to cylindrical, cubic, pyramid, rectangular, ovular, or any other multi-sided symmetric or asymmetric three-dimensional shape. The inflatable bladders shown in the drawings are drawn as circles or spheres for illustration purposes only.

FIG. 1 shows the launch, separation, and recovery process of the launch vehicle 4, upper stage 8, rocket 12, and fairings 16. The launch vehicle 4 takes off at time $t_1$. The upper stage 8 separates from the rocket 12 at time $t_2$. At time $t_3$ the engine of the upper stage 8 ignites to propel the payload to the desired location. The fairings 16 enclose the payload. At time $t_4$ the fairings 16A, 16B separate from the upper stage 8. The upper stage 8 and payload continue to the desired final destination. The fairings 16A, 16B deploy or initiate the deployment sequence of the recovery system at time $t_5$. In one embodiment, the recovery system includes a plurality of inflatable bladders or bags 20 on each fairing 16A, 16B.

At time $t_5$, one or more inflatable bladders 20 are deployed on each fairing 16A, 16B. To deploy the bladders 20, the bladders may be inflated with air, a gas other than air, a liquid, a light solid (e.g., foam), or a combination of two or more of these. Preferably, the bladders 20 are filled with pressurized nitrogen and/or hydraulic liquids.

At time $t_6$ the fairings 16A, 16B descend toward the ground. The inflated bladders 20 may cover, protect, shield, and/or slow the descent of the fairings 16A, 16B during re-entry. Thus, the inflatable bladders 20 may cover a portion of the fairing to protect or shield the fairing from damage during re-entry.

The inflated bladders 20 may also function as a heat shield during re-entry; an air-break during descent, slowing the fairings' 16A, 16B impact with the water; and/or upon splash down, absorbing some of the forces when the fairings 16A, 16B impact the water to reduce or eliminate damage to the fairings when they land in water 24, preferably an ocean. The bladders 20 may also assist the fairings 16A, 16B in floating on the water 24 until the fairings 16A, 16B can be retrieved by a marine vessel or aircraft.

The bladders 20 themselves may be made from a robust material capable of withstanding ascent, inflation, descent, and splash down or impact. One exemplary material is Vectran, a fiber spun from liquid-crystal polymer, made by Celanese Corporation or Kuraray America, Inc. However, other materials can be used.

Figure 2:
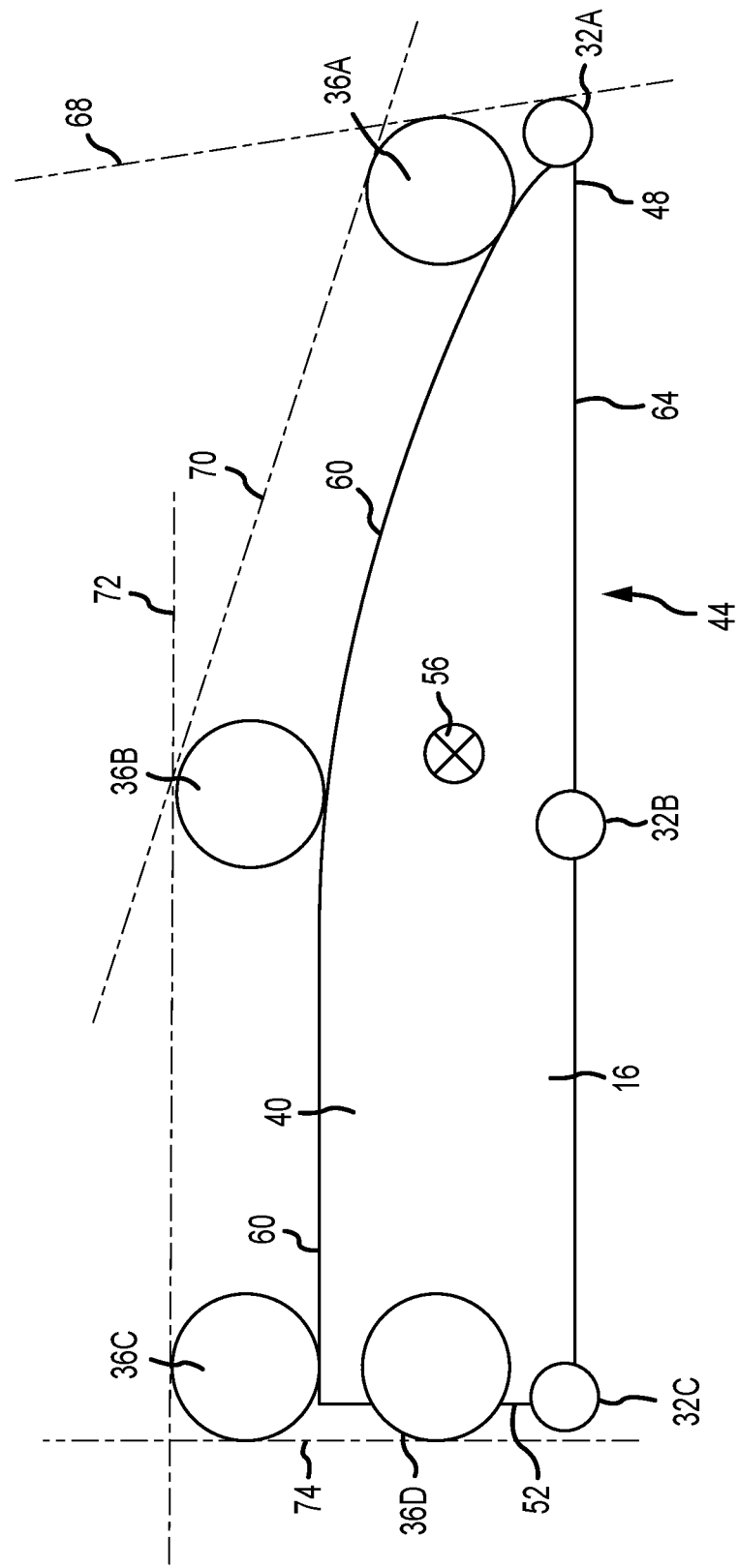
FIG. 2 is a side elevation view of a fairing with multiple inflated bladders.

FIG. 2 is a side elevation view of a fairing 16 with inflated bladders 32A-C, 36A-D. The fairing 16 has an outer surface 40 (shown) and an inside or inner surface 44 (not shown). The fairing 16 also has a nose portion 48 opposite a base 52. In the embodiment shown, the fairing 16 has a half cone shape with a curved outer surface 40 that tapers outward from the nose 48 to the base 52. The fairing 16 also has a center of gravity 56, a spine 60, and two edges 64 (only one edge 64 is visible in this view). The fairing 16 can have one or more inflatable bladders 32A-C, 36A-D, i.e., an array of inflatable bladders 32A-C, 36A-D, where different inflatable bladders 32A-C, 36A-D in the array perform different functions and have different properties. For example, in some embodiments, the array comprises a plurality of "floating" inflatable bladders 32A, 32B, 32C and a plurality of "deflating" bladders 36A, 36B, 36C, 36D. The deflating bladders 36A, 36B, 36C, 36D are designed to burst upon impact to absorb some impact forces. The deflating bladders 36A, 36B, 36C, 36D may be a lighter or less robust material than the other bladders in the array. In some embodiments, the deflating bladders 36A, 36B, 36C, 36D may be thinner material than the other bladders in the array. The floating bladders 32A, 32B, 32C are designed to float the fairing 16 on the water. The deflating bladders 36A, 36B, 36C, 36D and floating bladders 32A, 32B, 32C may be on all sides of the fairing 16 such that it does not matter what portion or side of the fairing 16 impacts the water. Alternatively, the deflating bladders 36A, 36B, 36C, 36D may be on one or more discreet portions of the fairing 16 (e.g., the outer surface 40, the inner surface 44, along the spine 60 and/or base 52, or along the edges 64) and the floating bladders 32A, 32B, 32C may be on one or more other discreet portions of the fairing 16 (e.g., the outer surface 40, the inner surface 44, along the spine 60 and/or base 52, or along the edges 64). The dashed lines 68, 70, 72, 74 represent the impact planes depending on the orientation of the fairing 16 when it impacts the water. In some embodiments, the fairing 16 also has deflating bladders 36 along the edge(s) 64 such that there is another impact plane along the edge 64.

As discussed herein, the bladders can be filled or inflated to varying degrees. Thus, all bladders do not have to be fully inflated. Various embodiments may fill the bladders different amounts, meaning partially inflated to fully inflated to over-inflated. For example, some bladders may be fully inflated while other bladders are only partially inflated. In some embodiments, the deflating bladders 36 can be fully inflated or even over-inflated to promote bursting upon impact. Whereas the floating bladders 32 may be under-inflated to resist bursting upon impact. Alternatively, the floating bladders 32 may not be inflated until after impact and, therefore, may be fully inflated at that point to promote floatation.

Figure 3:
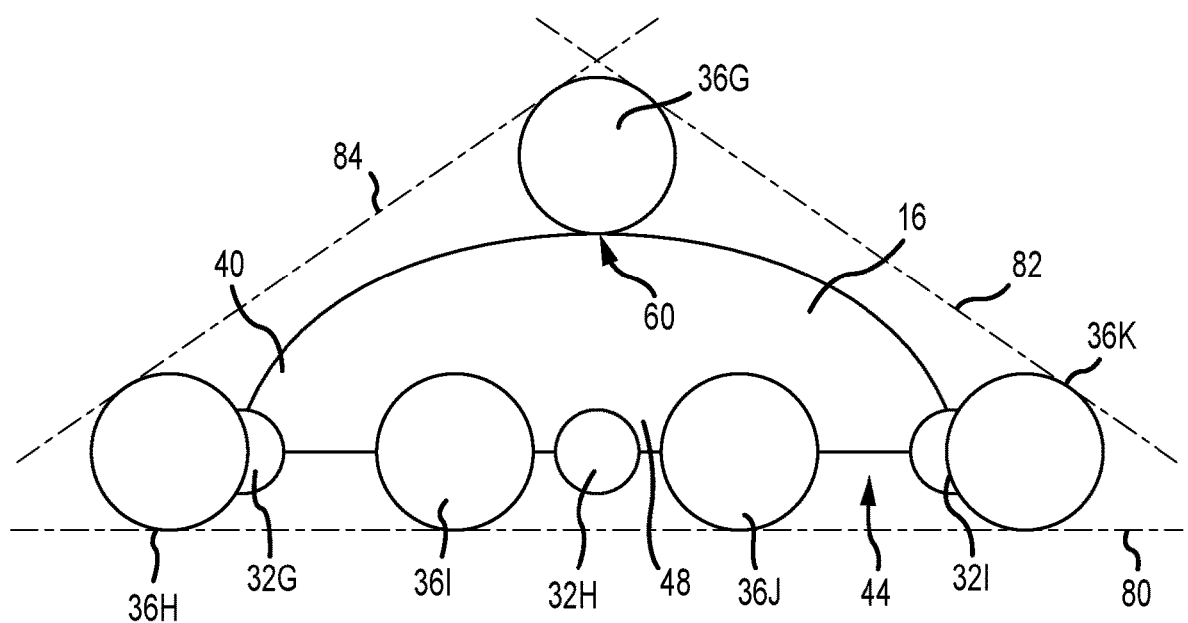
FIG. 3 is top elevation view of a fairing with inflated bladders, looking from the nose toward the base of the fairing.

FIG. 3 is top elevation view of a fairing 16 with inflated bladders 32G-I, 36G-K, looking from the nose 48 toward the base (i.e., aft facing). The nose portion 48 of the fairing 16 is proximate inflatable bladder 32H and the tip of the nose 48 is covered by inflatable bladder 32H. Inflatable bladder 36G is positioned on the spine 60 of the fairing 16. In this embodiment, the fairing 16 has multiple floating bladders 32G, 32H, 32I and multiple deflating bladders 36G, 36H, 36I, 36J, 36K. The deflating bladders 36G, 36H, 36I, 36J, 36K are positioned at various locations around the fairing 16 such that the fairing 16 can impact the water at any angle and no portion of the fairing 16 directly contacts the water at impact; rather the deflating bladders 36G, 36H, 36I, 36J, 36K directly contact the water at impact. The dashed lines 80, 82, 84 represent the impact planes depending on the orientation of the fairing 16 when it impacts the water. These impact planes 80, 82, 84 are in addition to the impact planes 68, 70, 72, 74 shown in FIG. 2.

In some embodiments, no inflatable bladders are positioned on the inside of the fairing 16, meaning on the inside or inner surface 44, such that if the inflatable bladders accidentally deploy early, they do not deploy into the payload or space vehicle.

In some embodiments, it is desirable for the fairing 16 to float in a concave position, as shown on the left of FIGS. 4A and 4B. In the concave position, the spine 60 of the fairing 16 is facing upward toward the air and the inside or inner surface 44 is facing downward toward the water 24. The concave position may trap air under the fairing 16 and prevent the fairing 16 from sinking.

However, in some embodiments, it is preferred that the fairing 16 floats in the convex position, as shown on the right side of FIGS. 4A and 4B, where the spine 60 of the fairing 16 is facing downward toward the water 24 and the inside or inner surface 44 is facing upward toward the air. For example, if the fairing 16 has insulation on the inside or inner surface 44, then in the concave position the insulation may absorb the salt water, which could prevent reuse of the fairing 16, could require extensive cleaning, or even require new insulation be installed on the fairing 16 which could undermine the potential savings of reusing the fairing 16.

In contrast, if the fairing 16 is in the convex position, then the fairing 16 could take on water in rough seas and sink. To address these problems, in various embodiments, the fairing 16 may have a boattail 90 proximate the base 52, as shown in FIG. 4B. The boattail 90 tapers inward and reduces the diameter of the base 52 of the fairing 16 such that the fairing 16 can fit on different sized boosters. The boattail 90 can also block sea water 24 from filling the fairing 16 when oriented in a convex position. The boattail 90 can block the air trapped under the fairing 16 from escaping when the fairing 16 is in the concave position. Without a boattail 90 and/or floatation assistance, a fairing 16 in the convex position will likely sink if given enough time.

Corrosive effects from salt water occur when the fairing 16 is exposed to air (oxygen) following exposure to salt water 24. Therefore, in some embodiments, the fairing 16 may be permitted to remain in a concave position and/or positioned just below the water's surface such that the fairing 16 is fully submerged to limit the exposure to oxygen. Corrosion can be reduced if exposure to air is reduced. In an alternative embodiment, inflatable bladders could be deployed upon splash down to completely lift the fairing 16 out of the water 24 (not shown) to avoid prolonged contact with salt water.

Figure 5:
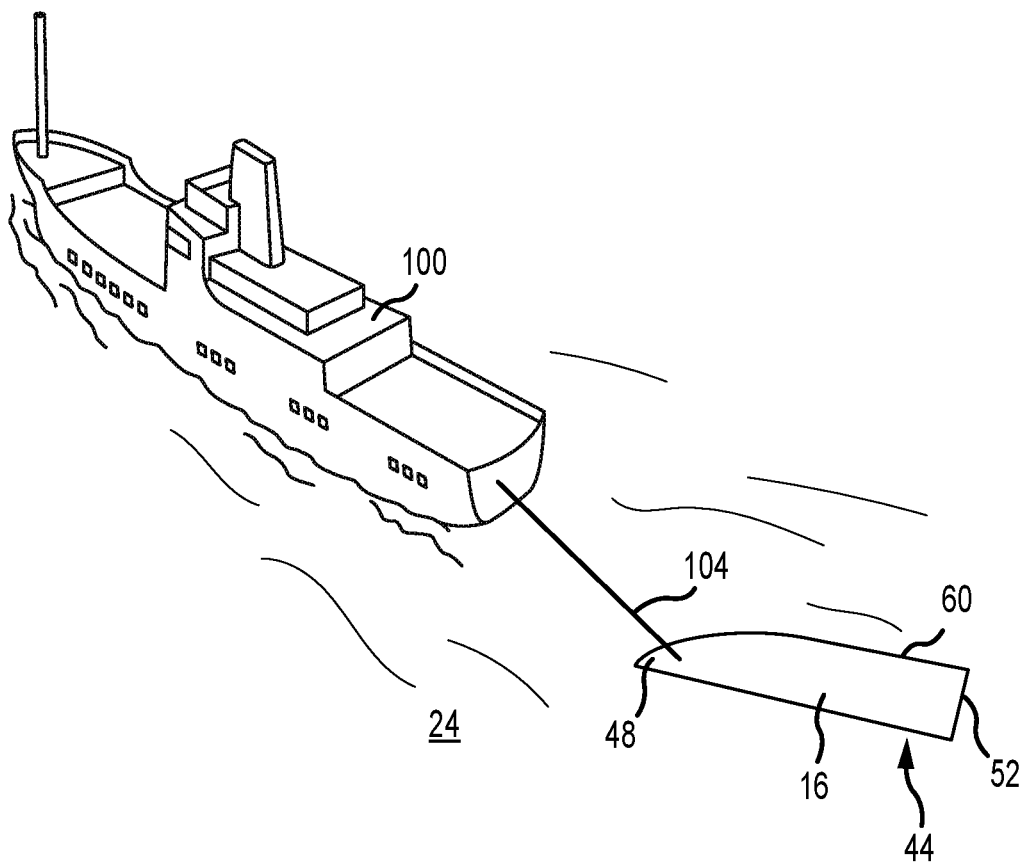
FIG. 5 shows a fairing being towed by a marine vessel.

Further, in some instances, it will be desired to tow the fairing 16 by a marine vessel 100 after capturing it. A fairing 16 may be more stable to tow in the concave, nose-forward position shown in FIG. 5, i.e., the spine 60 of the fairing 16 is facing upward toward the air and the inside or inner surface 44 is facing downward toward the water 24. Additionally, the nose-forward towing position is a stable position, aerodynamic, and the optimal load path. Aft-forward (i.e., base 52 forward) towing is unstable and not aerodynamic. In the aft-forward towing position, the fairing 16 has a tenancy to rotate and the fairing 16 induces air flow, which can cause the fairing 16 to jump up and down due to lift and drag forces. For example, air is forced into the fairing 16, which makes it harder to tow the fairing 16 due to draft.

When towed in the convex position (i.e., the spine 60 of the fairing 16 is facing downward toward the water 24 and the inside or inner surface 44 is facing upward toward the air), the fairing 16 may flex or "breathe" while being towed due to the forces imparted on the fairing 16 from the waves. Breathing occurs when the fairing 16 flexes inward and outward in a radial direction. Repeated flexing could weaken the structural integrity of the fairing 16 and reduce its reuse value. Therefore, it may be preferred to put the recovered fairing 16 on a barge or other boat to return it to the owner, rather than tow the fairing 16 in the water 24. The fairing 16 may be recovered from the water 24 by a barge or other means by lifting it out of the water 24.

Some embodiments of the present invention include a system or mechanism to flip the fairing 16 into the proper or desired floating position. Similar systems or mechanisms could be used on small watercraft (e.g., boats, ships, rafts, dinghies, other water vehicles, etc.) to prevent the watercraft from capsizing. The proper floating position may be concave or convex depending on the situation, the fairing 16 configuration, and the specific embodiment. Inflatable bladders or torsional resonance may be used to reorient the fairing 16, each of which are described in more detail herein.

In some embodiments, the inflatable bladders 20 may be arranged in a way or have properties that reorient or flip the fairing 16 into the desired floating position if the fairing 16 impacts the water in a position other than the desired floating position. For example, inflatable bladders may be located on one side of the fairing 16 such that should the fairing 16 come to rest with the wrong side facing the water, inflatable bladders 20 will deploy that reorient the fairing 16 onto the opposite side. The reorienting bladders 20 are configured to flip the fairing 16 over such that the floating bladders 20, 32 are now in contact with the water. Thus, in some embodiments, the floating bladders 20,32 are only on one side of the fairing 16 because the fairing 16 has a preferred floating position. If the fairing 16 lands in the proper floating position, then the reorienting bladders 20 will not be deployed. Moreover, the floating bladders 20, 32 may not deploy until the fairing 16 is in the proper floating position. Various systems could be used to detect the landing and/or floating position of the fairing 16 to determine which, if any, bladders 20 should be deployed. For example, a gyroscopic sensor could detect the landing and/or floating position of the fairing 16. In some embodiments, continuity circuits are used. A predetermined time after the fairings 16 separate from the launch vehicle, the system checks for signal continuity. If the fairing 16 is floating in the water, then balloons compress to complete the circuit, like a switch for a microcontroller or CPU, to know the landing and floating configuration.

In some embodiments, inflatable bladders 20 are used to flip the fairing 16 into the desired floating position. In one embodiment, inflatable bladders 20 are positioned and deployed in a sequence to act as a rotation ladder 108 to flip the fairing 16. See FIGS. 6-16. Here, one inflatable bladder 20 is deployed at a time, sequentially—one after another or in groups or clusters, e.g., two or more inflatable bladders 20 could be deployed at the same time. As each inflatable bladder 20 is deployed, a force is imparted on the fairing 16 to tilt the fairing 16 more and more in the desired direction, until finally the fairing 16 flips entirely over. In FIG. 6, the fairing 16 is positioned in the convex orientation and it is desired that the fairing 16 be positioned in the concave position (FIG. 16). The fairing 16 of FIGS. 6-16 is assumed to have a boattail and these figures are a top view of fairing 16 looking aft. FIGS. 6-16 show the fairing's center of gravity 56, the water line 104, the fairing buoyant force 112, the center of gravity force 116, and the bladder buoyant force 120.

In FIG. 6, the fairing 16 has no inflatable bladders deployed and the only forces acting on the fairing 16 are the fairing buoyant force 112 and the center of gravity force 116. Here, the fairing 16 is in a dynamically stable position and the center of gravity 56 is in line with the water line 104.

In FIG. 7, one inflatable bladder 20A on the fairing 16 has been deployed. The forces acting on the fairing 16 are the fairing buoyant force 112, the center of gravity force 116, and the bladder buoyant force 120. Here, the fairing 16 is in a dynamically unstable position and wants to rotate around its center of gravity 56.

In FIG. 8, the fairing 16 has rotated to a dynamically stable position with only one inflatable bladder 20A deployed. The forces acting on the fairing 16 are the fairing buoyant force 112, the center of gravity force 116, and the bladder buoyant force 120.

In FIG. 9, a second inflatable bladder 20B on the fairing 16 has been deployed. The forces acting on the fairing 16 are the fairing buoyant force 112, the center of gravity force 116, and the bladder buoyant force 120. Here, the fairing 16 is in a dynamically unstable position and the fairing 16 wants to rotate clockwise around its center of gravity 56.

In FIG. 10, the fairing 16 has rotated to a dynamically stable position with the two inflatable bladders 20A, 20B deployed. The forces acting on the fairing 16 are the center of gravity force 116 and the bladder buoyant force 120. In this position, the fairing 16 alone is no longer buoyant, thus there is no longer a fairing buoyant force acting on the fairing 16.

In FIG. 11, a third inflatable bladder 20C on the fairing 16 has been deployed. The forces acting on the fairing 16 are the center of gravity force 116 and the bladder buoyant force 120. Here, the fairing 16 is in a dynamically unstable position and the fairing 16 wants to rotate clockwise around its center of gravity 56. In this position, the fairing 16 alone is no longer buoyant, thus there is no longer a fairing buoyant force acting on the fairing 16.

In FIG. 12, the fairing 16 has rotated to a dynamically stable position with the three inflatable bladders 20A, 20B, 20C deployed. The forces acting on the fairing 16 are the center of gravity force 116 and the bladder buoyant force 120. In this position, the fairing 16 alone is no longer buoyant, thus there is no longer a fairing buoyant force acting on the fairing 16.

In FIG. 13, a fourth inflatable bladder 20D on the fairing 16 has been deployed, which is the last inflatable bladder 20 in the rotation ladder 108. The forces acting on the fairing 16 are the center of gravity force 116 and the bladder buoyant force 120. Here, the fairing 16 is in a dynamically unstable position and the fairing 16 wants to rotate clockwise around its center of gravity 56. In this position, the fairing 16 alone is no longer buoyant because water fills half of the cavity of the fairing and the fairing no longer displaces water, thus there is no longer a fairing buoyant force acting on the fairing 16.

In FIG. 14, the fairing 16 has rotated to a dynamically stable position with the four inflatable bladders 20A, 20B, 20C, 20D (i.e., the entire rotation ladder 108) deployed. The forces acting on the fairing 16 are the center of gravity force 116 and the bladder buoyant force 120. In this position, the fairing 16 alone is no longer buoyant, thus there is no longer a fairing buoyant force acting on the fairing 16. Here, the fairing would not continue to rotate if it was in calm waters because it is in a dynamically stable position. In rough waters, however, the fairing 16 would likely get rocked and kicked over. Alternatively, additional bladders or other mechanisms can be used to continue to rotate the fairing 16 to the desired position.

In FIG. 15, the fairing 16 continues to rotate around its center of gravity 56 and the rotation ladder 108 continues to flip the fairing 16 to the concave position. Here, the fairing 16 is in a dynamically unstable position and the fairing 16 wants to rotate clockwise around its center of gravity 56. In this position, the fairing 16 alone is no longer buoyant, thus there is no longer a fairing buoyant force acting on the fairing 16. The forces acting on the fairing 16 are the center of gravity force 116 and the bladder buoyant force 120.

In FIG. 16, the fairing 16 has rotated to the desired concave position, which is a dynamically stable position with the four inflatable bladders 20A, 20B, 20C, 20D (i.e., the entire rotation ladder 108) deployed. The forces acting on the fairing 16 are the center of gravity force 116 and the bladder buoyant force 120. In this position, the fairing 16 alone is no longer buoyant, thus there is no longer a fairing buoyant force acting on the fairing 16. Here, the fairing 16 is positioned above the water line 104 because there are additional bladders, which are not shown for clarity purposes, lifting the fairing 16 out of the water. For example, the fairing 16 may have bladders 20 positioned as shown in FIGS. 2 and 3.

In some embodiments, for example the embodiment shown in FIGS. 17-27, the inflatable bladders 20 are positioned and deployed in a sequence to act as a rotation cluster 128 to reorient the fairing 16. Again, as each inflatable bladder 20 is deployed, a force 120 is imparted on the fairing 16 to tilt the fairing 16 more and more in the desired direction, until finally the fairing 16 flips over. For example, the fairing 16 may begin in a convex position and the desired position is the concave position. Thus, the inflatable bladders 20 are deployed to flip the fairing 16 from the convex position to the concave position.

In FIG. 17, the fairing 16 is in the convex position and its center of gravity 56 is in line with the water line 104. No inflatable bladders have been deployed and the only forces acting on the fairing 16 are the fairing buoyant force 112 and the center of gravity force 116. Here, the fairing 16 is in a dynamically stable position; thus, the fairing 16 will not rotate without an additional force acting on the fairing 16.

In FIG. 18, one inflatable bladder 20F on the fairing 16 has been deployed. The forces acting on the fairing 16 are the fairing buoyant force 112, the center of gravity force 116, and the bladder buoyant force 120. Here, the fairing 16 is in a dynamically unstable position and the fairing 16 wants to rotate clockwise.

In FIG. 19, the fairing 16 has rotated clockwise to a dynamically stable position with only one inflatable bladder 20F deployed. The forces acting on the fairing 16 are the fairing buoyant force 112, the center of gravity force 116, and the bladder buoyant force 120.

In FIG. 20, a second inflatable bladder 20G on the fairing 16 has been deployed. The forces acting on the fairing 16 are the fairing buoyant force 112, the center of gravity force 116, and the bladder buoyant force 120. Here, the fairing 16 is in a dynamically unstable position and the fairing 16 wants to rotate clockwise.

In FIG. 21, the fairing 16 has rotated to a dynamically stable position with the two inflatable bladders 20F, 20G deployed. The forces acting on the fairing 16 are the center of gravity force 116, the fairing buoyant force 112, and the bladder buoyant force 120

In FIG. 22, a third inflatable bladder 20H on the fairing 16 has been deployed. The forces acting on the fairing 16 are the center of gravity force 116, the fairing buoyant force 112, and the bladder buoyant force 120. Here, the fairing 16 is in a dynamically unstable position and the fairing 16 wants to rotate clockwise around its center of gravity.

In FIG. 23, a fourth inflatable bladder 20I on the fairing 16 has been deployed, which is the last inflatable bladder 20 in the rotation cluster 128 needed to rotate the fairing 16 to the concave position, at least in some embodiments. Other embodiments may require additional inflatable bladders 20 in the cluster 128 to flip the fairing 16. The forces acting on the fairing 16 are the center of gravity force 116 and the bladder buoyant force 120. Here, the fairing 16 is in a dynamically unstable position and the fairing 16 wants to rotate clockwise around its center of gravity. In this position, the fairing 16 alone is no longer buoyant, thus there is no longer a fairing buoyant force acting on the fairing 16.

In FIG. 24, the fairing 16 has rotated to a dynamically stable position with the four inflatable bladders 20F, 20G, 20H, 20I (i.e., the rotation cluster 128) deployed. The forces acting on the fairing 16 are the center of gravity force 116 and the bladder buoyant force 120. In this position, the fairing 16 alone is no longer buoyant, thus there is no longer a fairing buoyant force acting on the fairing 16.

In FIG. 25, the fairing 16 continues to rotate around its center of gravity and the rotation cluster 128 continues to flip the fairing 16 to the concave position. Here, the fairing 16 is in a dynamically unstable position and the fairing 16 wants to rotate clockwise around its center of gravity. In this position, the fairing 16 alone is no longer buoyant, thus there is no longer a fairing buoyant force acting on the fairing 16. The forces acting on the fairing 16 are the center of gravity force 116 and the bladder buoyant force 120.

In FIG. 26, the fairing 16 continues to rotate around its center of gravity and the rotation cluster 128 continues to flip the fairing 16 to the concave position. Here, the fairing 16 is in a dynamically unstable position and the fairing 16 wants to rotate clockwise around its center of gravity. In this position, the fairing 16 alone is no longer buoyant, thus there is no longer a fairing buoyant force acting on the fairing 16. The forces acting on the fairing 16 are the center of gravity force 116 and the bladder buoyant force 120.

In FIG. 27, the fairing 16 has rotated to the concave position, which is a dynamically stable position with the multiple inflatable bladders 20 in the rotation cluster 128 deployed. Here, even more inflatable bladders 20 in the cluster 128 have been deployed. The additional inflatable bladders 20 may be filled with a lightweight gas to "lift" the fairing 16 out of the water and above the water line 104. The forces acting on the fairing 16 are the center of gravity force 116 and the bladder buoyant force 120. Here, the fairing 16 is positioned above the water line 104 because there are additional bladders, which are not shown for clarity purposes, lifting the fairing 16 out of the water. For example, the fairing 16 may have bladders 20 positioned as shown in FIGS. 2 and 3.

In this position, the fairing 16 alone is no longer buoyant, thus there is no longer a fairing buoyant force acting on the fairing 16.

In yet another embodiment, inflatable bladders 20 are positioned and deployed to act as an "L" lever 140 to flip the fairing 16. See FIGS. 28-34. In this embodiment, a group of inflatable bladders 20 is deployed, forming one leg 132 of the "L" lever 140. Subsequently, another group of inflatable bladders 20 is deployed, forming the other leg 136 of the "L" lever 140. Each leg 132, 136 of the "L" lever 140 flips the fairing 16 an amount in the desired direction. In one embodiment, each leg 132, 136 of the "L" lever 140 flips the fairing 16 at least about 90 degrees.

Figure 28:
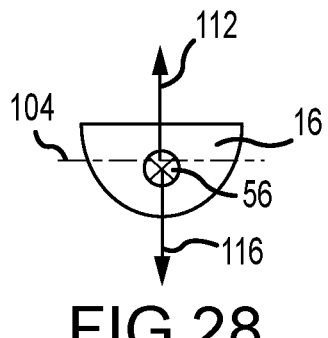
FIGS. 28-34 show a fairing with inflatable bladders forming an "L" lever to flip the fairing over and show the sequence of the inflatable bladders being deployed and the fairing flipping over.

In FIG. 28, the fairing 16 has no inflatable bladders deployed and the only forces acting on the fairing 16 are the fairing buoyant force 112 and the center of gravity force 116. Here, the fairing 16 is in a dynamically stable position and the center of gravity 56 is in line with the water line 104.

Figure 29:
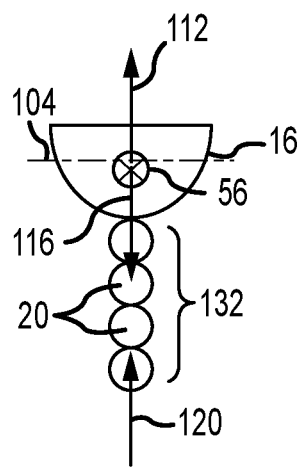

In FIG. 29, the inflatable bladders 20 of one leg 132 of the "L" lever are deployed. The forces acting on the fairing 16 are the fairing buoyant force 112, the bladder buoyant force 120, and the center of gravity force 116. Here, the fairing 16 is in a dynamically unstable position, the fairing 16 wants to rotate either direction around its center of gravity 56, and the center of gravity 56 is below the water line 104.

Figure 30:
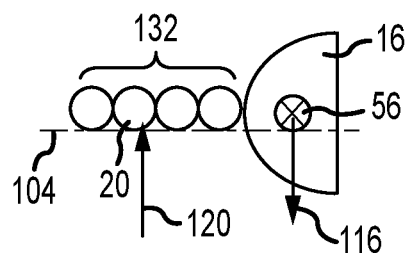

The first deployed leg 132 of the "L" lever causes the fairing 16 to rotate about 90 degrees around the fairing's center of gravity 56, which results in the position shown in FIG. 30. Here, the fairing 16 is in a dynamically stable position and the center of gravity 56 and the inflatable bladders 20 are positioned just above the water line 104. The forces acting on the fairing 16 are the bladder buoyant force 120 and the center of gravity force 116. In this position, the fairing 16 alone is no longer buoyant, thus there is no longer a fairing buoyant force acting on the fairing 16.

Figure 31:
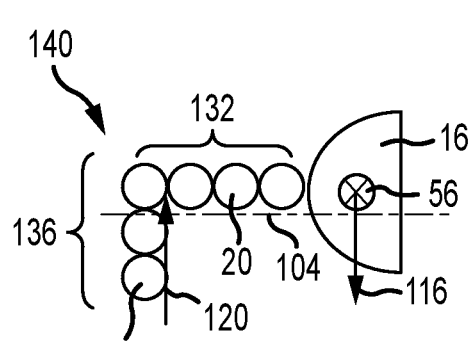

In FIG. 31, the inflatable bladders 20 of the second leg 136 of the "L" lever 140 are deployed at a right angle relative to the first leg 132. The two legs 132, 136 form the "L" lever 140. The forces acting on the fairing 16 are the bladder buoyant force 120 and the center of gravity force 116. Here, the fairing 16 is in a dynamically unstable position and the fairing 16 wants to rotate clockwise around its center of gravity 56. In this position, the fairing 16 alone is no longer buoyant, thus there is no longer a fairing buoyant force acting on the fairing 16.

Figure 32:
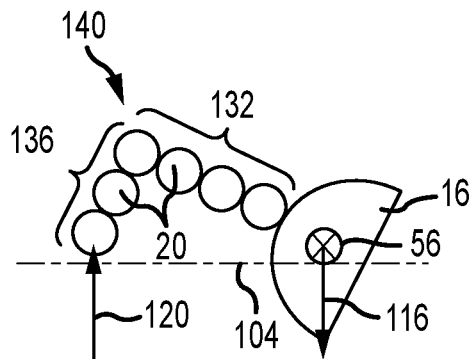

In FIG. 32, the fairing 16 is rotating around its center of gravity 56 due to the force 120 exerted on the fairing 16 by inflatable bladders 20 deployed to form the second leg 136 of the "L" lever 140. The forces acting on the fairing 16 are the bladder buoyant force 120 and the center of gravity force 116. In this position, the fairing 16 alone is no longer buoyant, thus there is no longer a fairing buoyant force acting on the fairing 16.

Figures 33, 34:
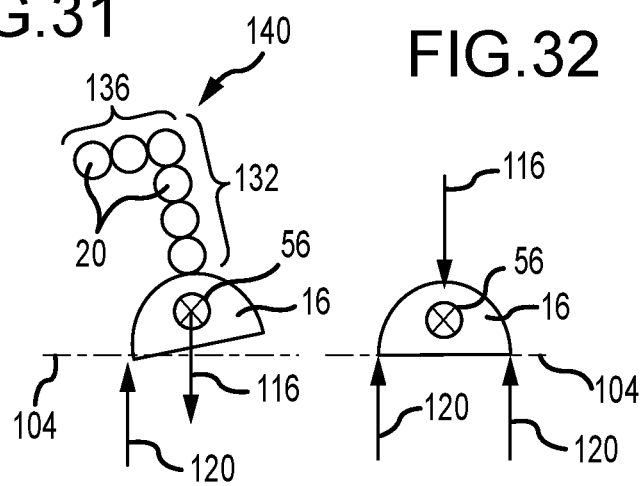

In FIG. 33, the fairing 16 is rotating clockwise around its center of gravity 56 due to the force 120 exerted on the fairing 16 by inflatable bladders 20 deployed to form the second leg 136 of the "L" lever 140. The forces acting on the fairing 16 are the bladder buoyant force 120 and the center of gravity force 116. In this position, the fairing 16 alone is no longer buoyant, thus there is no longer a fairing buoyant force acting on the fairing 16.

In FIG. 34, the fairing 16 has rotated to the concave position, which is a dynamically stable position. Here, the "L" lever 140 has deflated and floating bladders (not shown for clarity purposes) may be inflated to cause the fairing 16 to float above the water line 104. For example, the fairing 16 may have bladders 20 positioned as shown in FIGS. 2 and 3. The forces acting on the fairing 16 are the center of gravity force 116 and the bladder buoyant force 120.

In other embodiments, torsional resonance is used to flip the fairing 16 into the desired floating position. In one embodiment, a pendulum 150 is used to flip the fairing 16. See FIGS. 35A-45. FIGS. 35A-B show the pendulum 150 stored in the fairing 16 during flight and reentry. FIG. 35A is a top sectional view of the fairing 16 looking from the nose in the aft direction with the pendulum 150 stored in the fairing 16. Preferably, the pendulum 150 is stored along the center of the fairing 16. FIG. 35B is a side sectional view showing the location of the stored pendulum 150. The pendulum 150 comprises a shaft 154 and a weight 158 on one end of the shaft 154. In some embodiments, the shaft is positioned along the spine 60 of the fairing 16 and may be curved to align with the curve of the fairing's spine 60. In some embodiments, the weight 158 is stored proximate the nose 48 of the fairing 16. In other embodiments, the weight 158 of the pendulum 150 can be stored proximate the base 52 of the fairing 16. The pendulum 150 is deployed as shown in FIGS. 36A-B once the fairing 16 lands in the water in an undesired position, e.g., in the convex position.

FIG. 37 shows the pendulum 150 in the stored position after the fairing 16 has landed in a convex position on the water 104. FIG. 38 shows the pendulum 150 deployed. The pendulum 150 has a motor 58 that drives the pendulum 150 at the fairing's natural or resonant rocking frequency of the fairing's roll oscillation. The motor 58 may be an electric motor, a gas motor, or any other known motor. FIGS. 39-44 show the pendulum 150 rocking the fairing 16 and the fairing 16 rocking with the pendulum 150. The fairing 16 will rock more and more as the pendulum 150 swings from side to side, until the fairing 16 flips over to the concave position (FIG. 45). At this point (FIG. 45), the motor would shut down and the pendulum 150 would stop rocking. The fairing 16 is now in the desired position: concave.

In another embodiment, a reaction wheel 170 is used to flip the fairing 16 into the desired floating position. See FIGS. 46A-53. FIG. 46A is a top sectional view of the fairing 16 looking from the nose in the aft direction and FIG. 46B is a side sectional view. FIGS. 46A and 46B show the reaction wheel 170 located on an inner surface of the spine 60 of the fairing 16 proximate the base 52 of the fairing 16. The payload adapter fitting ("PAF") 174 is shown in FIG. 46B and is located proximate the base 52 of the fairing 16. Preferably, the reaction wheel 170 is located at the base of the PAF 174 to minimize the impact of the reaction wheel 170 on the payload volume.

Some embodiments include multiple reaction wheels 170, which have smaller motors that protrude less into the payload volume. See FIGS. 47A-B. FIG. 47A is a top sectional view of the fairing 16 looking from the nose in the aft direction and FIG. 47B is a side sectional view. Any number of reaction wheels 170 can be used and can be placed in various locations on the inside of the fairing 16. For example, the reaction wheels 170A-E can be positioned along the inner surface of the curved portion 178 of the fairing 16, as shown in FIG. 47A. More or fewer reaction wheels 170 could be used in different embodiments. Additionally, in some embodiments, multiple reaction wheels 170F-M are positioned on the inner surface of the fairing 16 along the length L of the fairing 16, i.e., from the base 52 to the nose 48 of the fairing, as shown in FIG. 47B. Some reaction wheels 170H, 170I, 170M may be positioned on the inner surface along the spine 60 of the fairing 16. Other reaction wheels 170F, 170K, 170L may be positioned on the inner surface along the edge 64 of the fairing. Still other reaction wheels 170G, 170I may be located on the inner surface somewhere between the spine 60 and the edge 64 of the fairing 16.

FIG. 48 shows the fairing 16 with a reaction wheel 170 after the fairing 16 has landed in a convex position on the water 104. The reaction wheel 170 is weighted and rocks the fairing 16 as the wheel 170 rotates. The reaction wheel 170 is driven by a motor at the natural frequency of the fairing's roll oscillation. The motor (not shown) may be an electric motor, a gas motor, or any other known motor. FIGS. 49-52 show the reaction wheel 170 rocking the fairing 16 and the fairing 16 rocking relative to the water 104. The fairing 16 will rock more and more as the reaction wheel 170 rotates, until the fairing 16 flips over into the concave position (FIG. 53).

A number of variations and modifications of the invention can be used. Different combinations of elements in the above embodiments can be used. Thus, one or more elements from one embodiment can be used with one or more elements from another embodiment. For example, the fairing may have one or more inflatable bladders to protect the fairing during re-entry and one or more torsional resonance elements to reorient the fairing when it lands in water. Further, both inflatable bladders and torsional resonance elements can be used to reorient or flip the fairing when it lands in water in an undesirable position.

It would be possible to provide for some features of the invention without providing others.

The present invention, in various embodiments, configurations, or aspects, includes components, methods, processes, systems and/or apparatus substantially as depicted and described herein, including various embodiments, configurations, aspects, sub-combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. It is to be understood that the phraseology and terminology used herein is for the purpose of description and should not be regarded as limiting.

What is claimed is:

1. A fairing recovery system comprising:
  a fairing with an inner surface and an outer surface, wherein when the fairing is interconnected to a launch vehicle, the inner surface faces toward the launch vehicle and the outer surface faces away from the launch vehicle;
  a plurality of inflatable bladders interconnected to the outer surface of the fairing, wherein when the fairing is interconnected to the launch vehicle the plurality of inflatable bladders are not inflated, and wherein after the fairing separates from the launch vehicle one or more inflatable bladders in the plurality of inflatable bladders are at least partially inflated with pressurized nitrogen gas and/or hydraulic liquids; and
  a torsional resonance element having an active state and an inactive state, wherein when in the active state the torsional resonance element imparts a motion to the fairing.

2. The fairing recovery system of claim 1, wherein the plurality of inflatable bladders comprises one or more deflating bladders that are inflated after the fairing separates from the launch vehicle and that deflate upon impact with a water surface.

3. The fairing recovery system of claim 1, wherein the plurality of inflatable bladders comprises one or more floating bladders that are inflated after the fairing impacts the water surface and remain inflated for a period of time following a time when the fairing impacts the water surface.

4. The fairing recovery system of claim 3, wherein the floating bladders are comprised of a different material than the deflating bladders.

5. The fairing recovery system of claim 1, wherein the torsional resonance element is selected from the group comprising: a pendulum with a motor and one or more reaction wheels with motors.

6. The fairing recovery system of claim 1, wherein one or more of the plurality of inflatable bladders are deployed at different times after the fairing impacts a water surface, and wherein the plurality of inflatable bladders reorient the position of the fairing relative to the water.

7. A fairing recovery system comprising:
  a fairing;
  one or more inflatable bags interconnected to the fairing, wherein when the fairing is interconnected to a launch vehicle the one or more inflatable bags is not inflated, wherein after the fairing separates from the launch vehicle the one or more inflatable bags are inflated with pressurized fluid, and wherein the one or more inflatable bags cause the fairing to float in water after impact;
  one or more deflating bags that are inflated after the fairing separates from the launch vehicle and that deflate upon impact with a water surface; and
  one or more floating bags that are inflated after the fairing impacts the water surface and remain inflated for a period of time following a time when the fairing impacts the water surface.

8. The fairing recovery system of claim 7, wherein the pressurized fluid can be a gas, liquid, or combination of gas and liquid.

9. The fairing recovery system of claim 7, wherein the pressurized fluid is pressurized nitrogen gas and/or hydraulic liquids.

10. The fairing recovery system of claim 7, further comprising a torsional resonance element having an active state and an inactive state, wherein when in the active state the torsional resonance element imparts a motion to the fairing.

11. The fairing recovery system of claim 10, wherein the torsional resonance element is selected from the group comprising: a pendulum with a motor and one or more reaction wheels with motors.

12. The fairing recovery system of claim 7, further comprising a plurality of inflatable bags, wherein some of the inflatable bags in the plurality of inflatable bags are deployed at different times after the fairing impacts a water surface, and wherein the some of the inflatable bags reorient the position of the fairing relative to the water.

13. A method of recovering a fairing comprising:
  providing a fairing with an inner surface and an outer surface, wherein when the fairing is interconnected to a spacecraft, the inner surface faces toward the spacecraft and the outer surface faces away from the spacecraft;
  providing a plurality of inflatable bladders interconnected to at least one of the outer surface and the inner surface of the fairing, wherein when the fairing is interconnected to the spacecraft the plurality of inflatable bladders is not inflated;
  at least partially filling one or more inflatable bladders in the plurality of inflatable bladders with pressurized fluid after the fairing separates from the spacecraft, wherein the one or more inflatable bladders cover at least a portion of the fairing during re-entry;
  providing a second plurality of inflatable bladders interconnected to at least one of the outer surface and the inner surface of the fairing;
  deploying inflatable bladders in the second plurality of inflatable bladders in succession after the fairing impacts the water surface; and
  reorienting a position of the fairing relative to the water surface.

14. The method of recovering a fairing of claim 13, wherein the pressurized fluid can be a gas, liquid, or combination of gas and liquid.

15. The method of recovering a fairing of claim 13, further comprising at least partially inflating a second inflatable bladder in the plurality of inflatable bladders with pressurized fluid after the fairing impacts a water surface such that the second inflatable bladder assists the fairing in floating on the water surface.

16. The method of recovering a fairing of claim 15, further comprising at least partially filling a third inflatable bladder in the plurality of inflatable bladders with pressurized fluid after the fairing separates from the spacecraft, wherein the third inflatable bladder absorbs some of the impact forces when the fairing impacts the water surface.

17. The method of recovering a fairing of claim 13, further comprising rotating the fairing from a convex floating position to a concave floating position.

18. The method of recovering a fairing of claim 13, further comprising rotating the fairing from a concave floating position to a convex floating position.

19. The method of recovering a fairing of claim 13, further comprising:
   providing a torsional resonance element interconnected to the fairing; and
   reorienting a position of the fairing relative to the water surface after the fairing lands on the water surface using the torsional resonance element.

* * * * *